(12) United States Patent
Madhu

(10) Patent No.: US 10,610,018 B1
(45) Date of Patent: Apr. 7, 2020

(54) DUAL CAM RECLINER MECHANISM

(71) Applicant: LEAR CORPORATION, Southfield, MI (US)

(72) Inventor: Adarsha B. Madhu, Novi, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 16/188,439

(22) Filed: Nov. 13, 2018

(51) Int. Cl.
*B60N 2/23* (2006.01)
*A47C 1/027* (2006.01)
*G05G 5/18* (2006.01)
*B60N 2/235* (2006.01)

(52) U.S. Cl.
CPC ............. *A47C 1/027* (2013.01); *B60N 2/236* (2015.04); *B60N 2/2356* (2013.01); *B60N 2/2362* (2015.04); *G05G 5/18* (2013.01); *G05G 2505/00* (2013.01)

(58) Field of Classification Search
CPC ..... B60N 2/236; B60N 2/2356; B60N 2/2362
See application file for complete search history.

(56) References Cited

U.S. PATENT DOCUMENTS

| | | | |
|---|---|---|---|
| 7,261,379 B2 | 8/2007 | Volker et al. | |
| 8,985,689 B2 | 3/2015 | McCulloch et al. | |
| 9,731,633 B2 | 8/2017 | Veine et al. | |
| 9,873,357 B1 | 1/2018 | McCulloch et al. | |
| 2005/0168034 A1 | 8/2005 | Fast | |
| 2007/0145800 A1* | 6/2007 | Thiel | B60N 2/236 297/367 R |
| 2012/0161488 A1* | 6/2012 | Ishihara | B60N 2/236 297/367 R |
| 2014/0125096 A1 | 5/2014 | Barzen et al. | |
| 2015/0321585 A1 | 11/2015 | McCulloch et al. | |
| 2016/0023578 A1 | 1/2016 | Tame et al. | |
| 2017/0203671 A1 | 7/2017 | Runde | |
| 2018/0029506 A1* | 2/2018 | Maeda | B60N 2/236 |
| 2018/0279784 A1 | 10/2018 | Veine et al. | |

FOREIGN PATENT DOCUMENTS

| | | | | |
|---|---|---|---|---|
| CA | 2711966 A1 * | 7/2009 | ............. | B60N 2/206 |
| CA | 2727953 A1 * | 2/2010 | ............. | B60N 2/236 |

OTHER PUBLICATIONS

Antoine Moulin, U.S. Appl. No. 16/126,339, filed with the United States Patent and Trademark Office on Sep. 10, 2018.

* cited by examiner

*Primary Examiner* — Timothy J Brindley
(74) *Attorney, Agent, or Firm* — Brooks Kushman PC

(57) ABSTRACT

A recliner mechanism for a seat. The recliner mechanism may have first and second cams that may be rotatable about an axis. The first cam may engage and hold a pawl in an engaged position. The second cam may be spaced apart from the pawl when the pawl is in the retracted position.

20 Claims, 10 Drawing Sheets

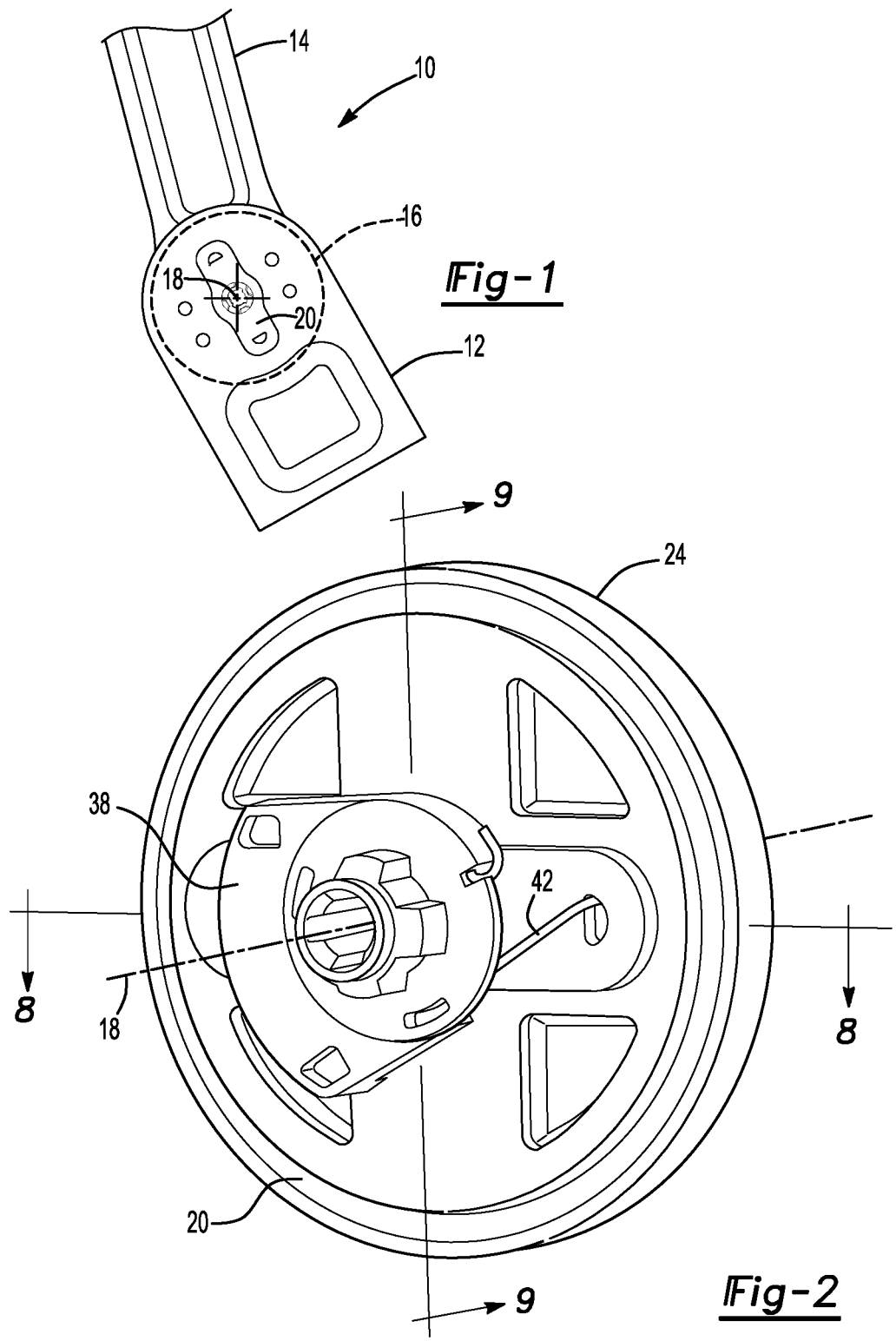

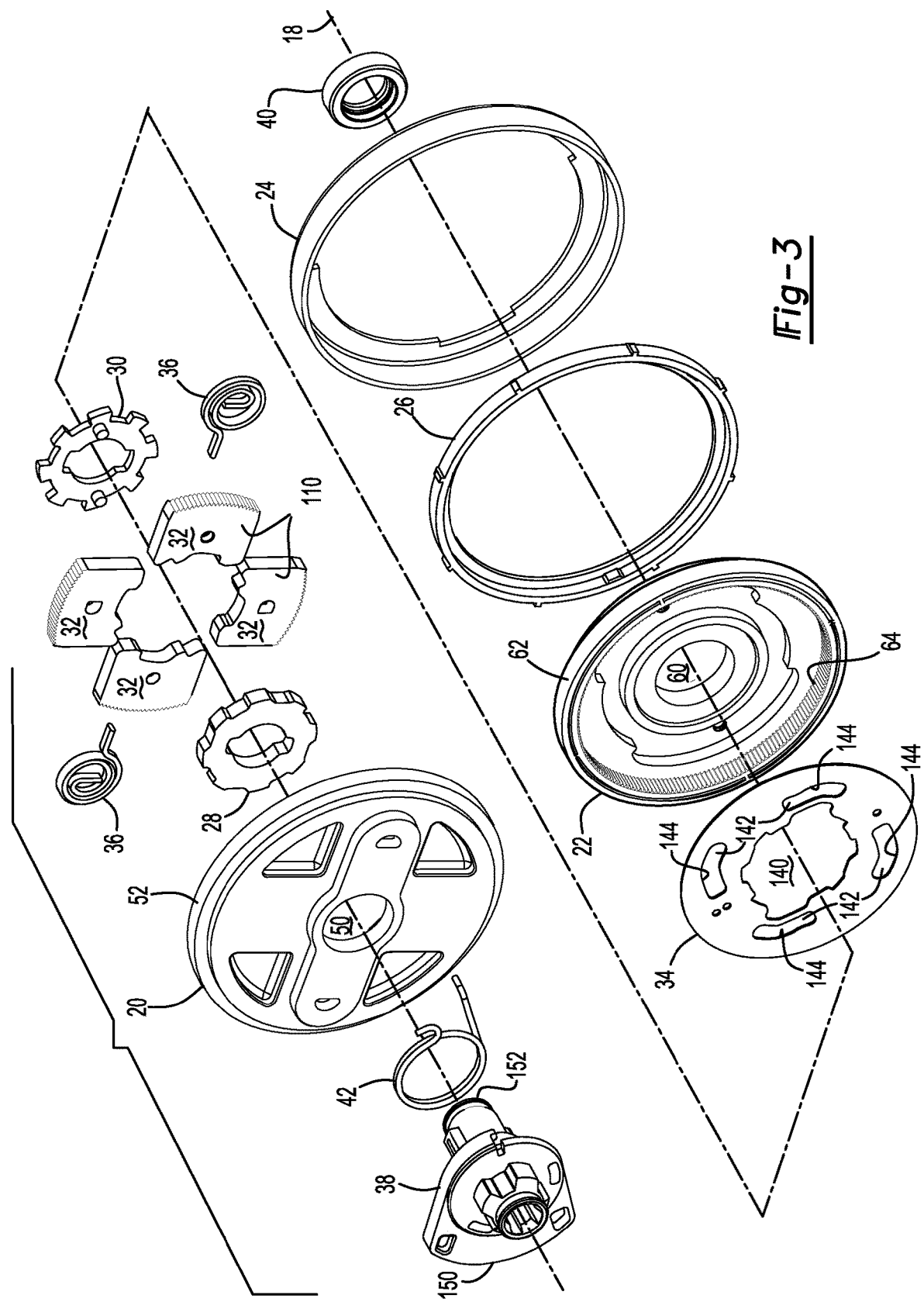

DUAL CAM RECLINER MECHANISM

TECHNICAL FIELD

This disclosure relates to a recliner mechanism that may be provided with a seat.

BACKGROUND

A dual cam recliner is disclosed in U.S. Patent Publication No. 2014/0125096.

SUMMARY

In at least one embodiment, a recliner mechanism is provided. The recliner mechanism may include a first plate, a second plate, a set of pawls, a first cam, and a second cam. The second plate may be rotatable about an axis with respect to the first plate. The second plate may have a set of teeth. The pawls may be movable between an engaged position and a retracted position. The pawls may engage the teeth to inhibit rotation of the second plate with respect to the first plate when the pawls are in the engaged position. The pawl may not engage the teeth to permit rotation of the second plate with respect to the first plate when the pawls are in the retracted position. The first cam may be rotatable about the axis and may engage the pawls to hold the pawls in the engaged position. The second cam may be rotatable about the axis with respect to the first cam. The second cam may be spaced apart from the set of pawls when the pawls are in the retracted position. The first cam may not be received inside the second cam.

In at least one embodiment, a recliner mechanism is provided. The recliner mechanism may include a first plate, a second plate, a set of pawls, a first cam, a second cam, and a driver. The second plate may be rotatable about an axis with respect to the first plate. The second plate may have a set of teeth. The set of pawls may be movable between an engaged position and a retracted position. The first cam and the second cam may be rotatable about the axis. The driver may be configured to rotate the first cam and the second cam. The first cam may engage the pawls and hold the pawls in the engaged position when the driver is in a first rotational position. The first cam may engage the pawls when the driver is in a second rotational position. The first cam may engage the pawls and the second cam may be spaced apart from the pawls when the driver is in a third rotational position.

In at least one embodiment, a recliner mechanism is provided. The recliner mechanism may include a first plate, a second plate, a set of pawls, a first cam, a second cam, and a driver. The second plate may be rotatable about an axis with respect to the first plate. The second plate may have a set of teeth. The pawls may be movable between an engaged position and a retracted position. Each pawl may have a first pawl lobe and a second pawl lobe. The first cam and the second cam may be rotatable about the axis. The driver may be configured to rotate the first cam and the second cam. The first cam may engage the first pawl lobe and the second pawl lobe of each pawl to hold the pawls in the engaged position when the first cam is inhibited from rotating about the axis and the driver is in a first rotational position. The second cam may engage the first pawl lobe and the second pawl lobe of each pawl to hold the pawls in the engaged position when the driver is in the first rotational position and the first cam is rotated about the axis with respect to the driver.

BRIEF DESCRIPTION OF THE DRAWINGS

FIG. 1 is a perspective view of a portion of a seat assembly having a recliner mechanism.

FIG. 2 is a perspective view of the recliner mechanism.

FIGS. 3 and 4 are exploded views of the recliner mechanism.

DETAILED DESCRIPTION

Figure 4:
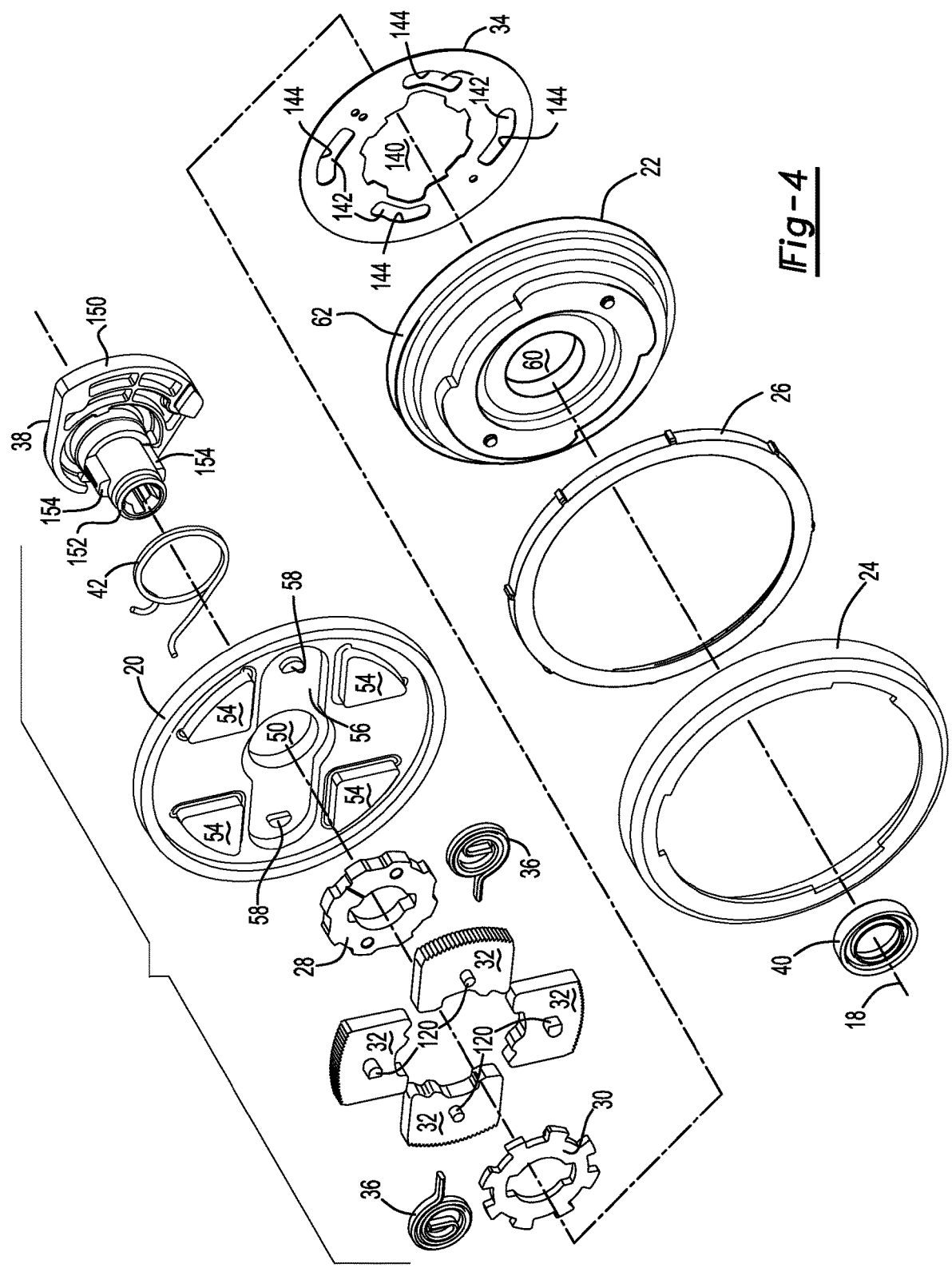

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a portion of a seat assembly 10 is shown. The seat assembly 10 may have a seat bottom 12, a seat back 14, and a recliner mechanism 16.

The recliner mechanism 16 may be configured to control pivoting of the seat back 14 about an axis 18 and with respect to the seat bottom 12. For example, the recliner mechanism 16 may facilitate pivoting of the seat back 14 between a folded position in which the seat back 14 may be generally positioned over the seat bottom 12 and a reclined position in which the seat back 14 is pivoted away from the seat bottom 12 such that the seat back 14 may be positioned at an obtuse angle with respect to the seat bottom 12. The recliner mechanism 16 may hold the seat back 14 in various angular positions between the folded position and the reclined position. As such, the recliner mechanism 16 may selectively permit pivoting or inhibit pivoting of the seat back 14 about the axis 18.

The recliner mechanism 16 may be disposed along a lateral side of the frame of the seat bottom 12 and a lateral side of a frame of the seat back 14. In addition, the recliner mechanism 16 may be positioned along the axis 18 between the frame of the seat bottom 12 and the frame of the seat back 14. For example, the recliner mechanism 16 is positioned axially inboard from the frame of the seat bottom 12 and axially outboard from the frame of the seat back 14.

Referring to FIG. 2, a perspective view of the recliner mechanism 16 is shown. The recliner mechanism 16 may generally have a disc shape.

Referring to FIGS. 3 and 4, exploded views of the recliner mechanism 16 are shown. More specifically, FIGS. 3 and 4 show components of the recliner mechanism 16 from different perspectives to better depict features that may not be visible from a single perspective or when the recliner mechanism 16 is assembled. In at least one configuration, the recliner mechanism 16 may include a first plate 20, a second plate 22, a retainer ring 24, a glide 26, a first cam 28, a second cam 30, at least one pawl 32, a cam disc 34, at least one biasing member 36, a driver 38, a retainer 40, and a driver biasing member 42.

Referring to FIGS. 3 and 4, an example of a first plate 20 is shown. The first plate 20, which may also be referred to as a guide plate, may be configured to be fixedly positioned on the seat bottom 12 or fixedly positioned with respect to a seat bottom 12. In at least one configuration, the first plate 20 may be generally configured as a circular disc and may include a center hole 50, an outer surface 52, a plurality of guide blocks 54, and one or more slots 56.

The center hole 50 may be disposed proximate the center of the first plate 20. The center hole 50 may be configured as a through hole and may be radially disposed about the axis 18.

The outer surface 52 may be disposed opposite the center hole 50 and may face toward and may engage the retainer ring 24. In at least one configuration, the outer surface 52 or a portion thereof may be radially disposed with respect to the axis 18 and may at least partially define an outside circumference of the first plate 20.

The guide blocks 54 may be configured to guide movement of a pawl 32. In the configuration shown, four guide blocks are depicted; however, it is contemplated that a greater or lesser number of guide blocks may be provided, such as to accommodate a different number of pawls 32. The guide blocks 54 may be configured as protrusions that may extend from an interior side of the first plate 20 toward the second plate 22. A pair of guide blocks 54 may cooperate to at least partially define an opening that may receive a pawl 32. As such, a pawl 32 may be received between a pair of guide blocks 54 and the guide blocks 54 may guide movement of the pawl 32 in a radial direction, or in a direction that extends toward or away from the axis 18.

One or more slots 56 may be disposed between the center hole 50 and the outer surface 52. A slot 56 may be configured as a recess that may be disposed in the interior side of the first plate 20 that may face toward the second plate 22. A slot 56 may receive and position at least one biasing member 36 that may exert a biasing force on the first cam 28. The biasing force may urge or actuate one or more pawls 32 in a radially outward direction or away from the axis 18 as will be discussed in more detail below.

Referring to FIG. 4, one or more mounting features 58 may be associated with a slot 56. A mounting feature 58 may facilitate coupling of a biasing member 36 to the first plate 20. The mounting feature 58 may have any suitable configuration. In FIG. 4, the mounting feature 58 is configured as a protrusion that is disposed in the slot 56 and that extends toward the second plate 22; however, it is also contemplated that the mounting feature 58 may be provided in other configurations, such as a recess that may receive a portion of a biasing member 36.

Referring to FIGS. 3 and 4, an example of a second plate 22 is shown. The second plate 22, which may also be referred to as a gear plate, may be configured to be coupled to the seat back 14 and may be rotatable about the axis 18 with respect to the first plate 20. For example, the second plate 22 may be coupled to a side member of the seat back frame or may be fixedly disposed on a recliner mounting bracket that may be coupled to the seat back frame. In at least one configuration, the second plate 22 may include a center hole 60, an outer surface 62, and a set of teeth 64.

The center hole 60 may be disposed proximate the center of the second plate 22. The center hole 60 may be radially disposed about the axis 18.

Figure 8:
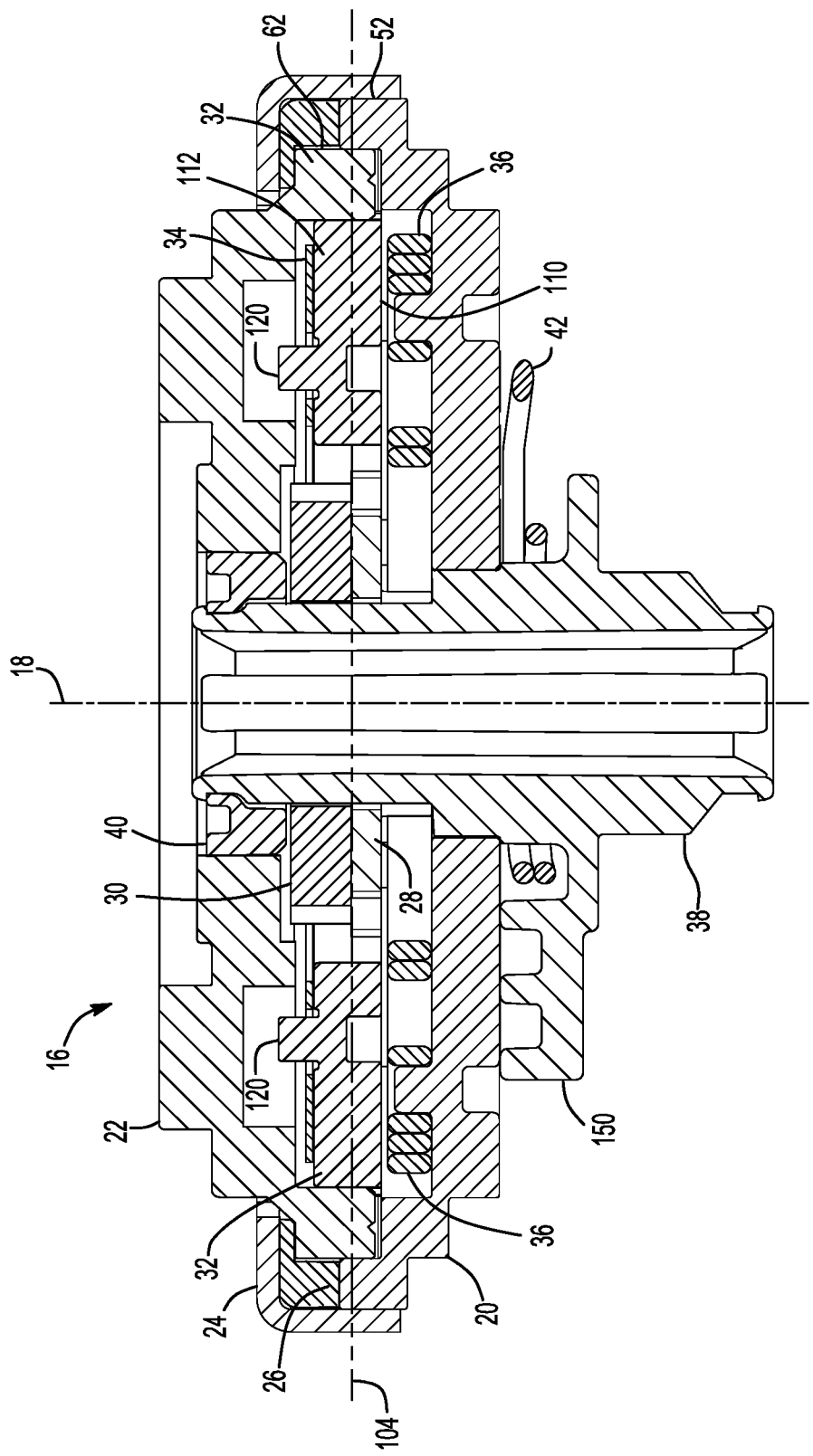
FIG. 8 is a section view of the recliner mechanism along section line 8-8.

The outer surface 62 may be disposed opposite the center hole 60 and may face toward the retainer ring 24. In at least one embodiment, the outer surface 62 or a portion thereof may be radially disposed with respect to the axis 18 and may at least partially define an outside circumference of the second plate 22. As is best shown in FIG. 8, the outer surface 62 of the second plate 22 may be disposed closer to the axis 18 than the outer surface 52 of the first plate 20.

The set of teeth 64 may be selectively engaged by the pawls 32. The set of teeth 64 may extend in an axial direction away from the first plate 20. For example, the set of teeth 64 may extend from an interior face of the second plate 22 that may face toward or may engage the first plate 20. The set of teeth 64 may be arranged around the axis 18 and may be located at a common radial distance from the axis 18 or a constant or substantially constant radial distance from the axis 18. Moreover, the set of teeth 64 may be disposed opposite the outer surface 62 and may face toward and extend toward the axis 18. In at least one configuration, members of the set of teeth 64 may be arranged in a repeating manner around the axis 18 and may be contiguous or may extend continuously around the axis 18.

The set of teeth 64 may have any suitable profile. As one nonlimiting example, the set of teeth 64 may be provided with a substantially triangular or sawtooth configuration. The profile of the set of teeth 64 may extend axially or substantially parallel to the axis 18.

Referring to FIGS. 2-4 and 8, the retainer ring 24 may rotatably couple the second plate 22 to the first plate 20. For example, the retainer ring 24 may be fixedly attached to the first plate 20 but may not be fixedly attached to the second plate 22. As such, the second plate 22 may be received between the retainer ring 24 and the first plate 20 such that axial movement of the second plate 22 is inhibited while rotational movement of the second plate 22 with respect to the retainer ring 24 and first plate 20 may be permitted. The retainer ring 24 may be fixedly attached to the first plate 20 in any suitable manner, such as by welding or with one or more fasteners. In at least one configuration, the retainer ring 24 may be configured as a ring that may extend continuously around the second plate 22 and the axis 18.

Referring to FIGS. 3, 4 and 8, the glide 26 may be located between the retainer ring 24 and the second plate 22. The glide 26 may act as a spacer that may separate the second plate 22 from the retainer ring 24 and may help reduce friction. The glide 26 may be configured as a ring and may be made of a polymeric material like nylon.

Figure 5:
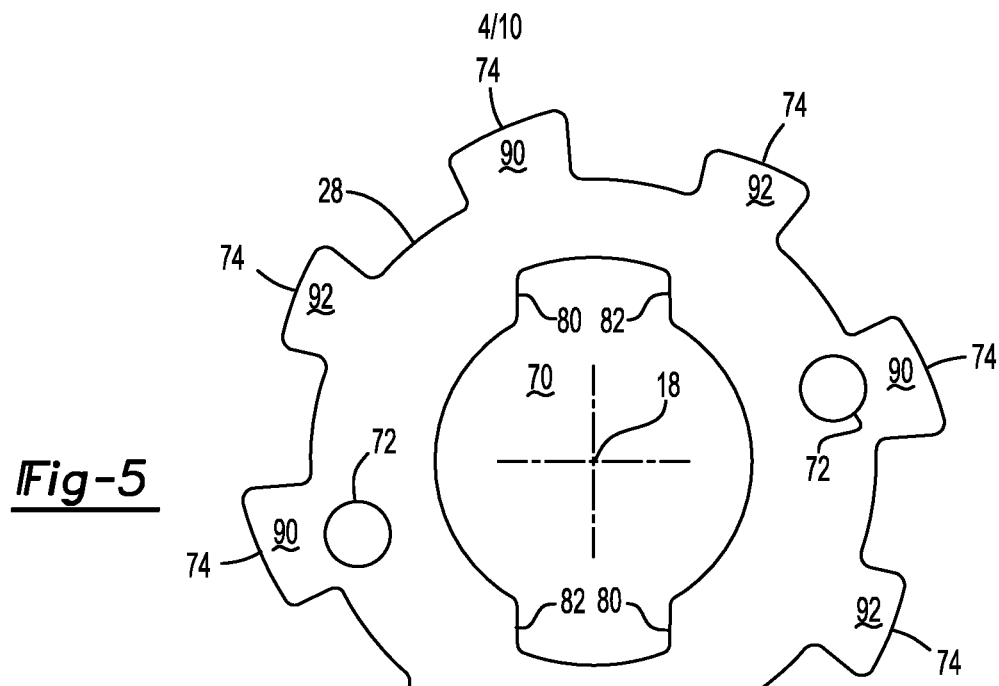
FIG. 5 is a side view of a first cam that may be provided with the recliner mechanism.

Referring to FIGS. 3-5, the first cam 28 may facilitate locking of the set of pawls 32. The first cam 28, which may also be referred to as an anti-chuck cam, may be received in the first plate 20, the second plate 22, or both, and may be configured to rotate about the axis 18. The first cam 28 may include a center hole 70, one or more pins 72, and a plurality of cam lobes 74.

The center hole 70 may be disposed proximate the axis 18. The center hole 70 may generally have a bowtie shape that may include a first side surface 80 and a second side surface 82 that may be disposed opposite the first side surface 80. The first side surface 80 and the second side surface 82 may extend away from the axis 18 and may be selectively engaged by the driver 38 to facilitate rotation of the first cam 28 about the axis 18 as will be discussed in more detail below.

The pins 72 may extend from a side of the first cam 28 toward the first plate 20. In addition, each pin 72 may be disposed between the center hole 70 and the outside perimeter of the first cam 28. For instance, each pin 72 may be radially positioned between the center hole 70 and a cam lobe 74. Each pin 72 may engage a corresponding biasing member 36 that may bias the first cam 28 to rotate in a manner that actuates the set of pawls 32 away from the axis 18.

The cam lobes 74 may be provided around the periphery of the first cam 28. In FIG. 5, eight cam lobes 74 are shown, although it is contemplated that a different number of cam lobes may be provided. The cam lobes 74 may be disposed opposite the center hole 70, may extend away from the axis 18, and may be configured to selectively engage and actuate the pawls 32. The cam lobes 74 may be spaced apart from each other and may be arranged around the axis 18.

The cam lobes 74 may be provided with a common configuration or multiple configurations. In the configuration shown in FIG. 5, the cam lobes 74 are provided with two different profiles. These profiles are referred to as a first cam lobe 90 and a second cam lobe 92.

The first cam lobes 90 and the second cam lobes 92 may be arranged in an alternating pattern around the axis 18. For example, each first cam lobe 90 may be positioned between two second cam lobes 92. Similarly, each second cam lobe 92 may be positioned between two first cam lobes 90. The first cam lobe 90 may have a different profile than the second cam lobe 92. For example, the first cam lobe 90 may extend further from the axis 18 than the second cam lobe 92. In addition, the first cam lobe 90 may have an exterior surface that may face away from the axis 18 that may have a greater length than the exterior surface of a second cam lobe 92.

Figure 6:
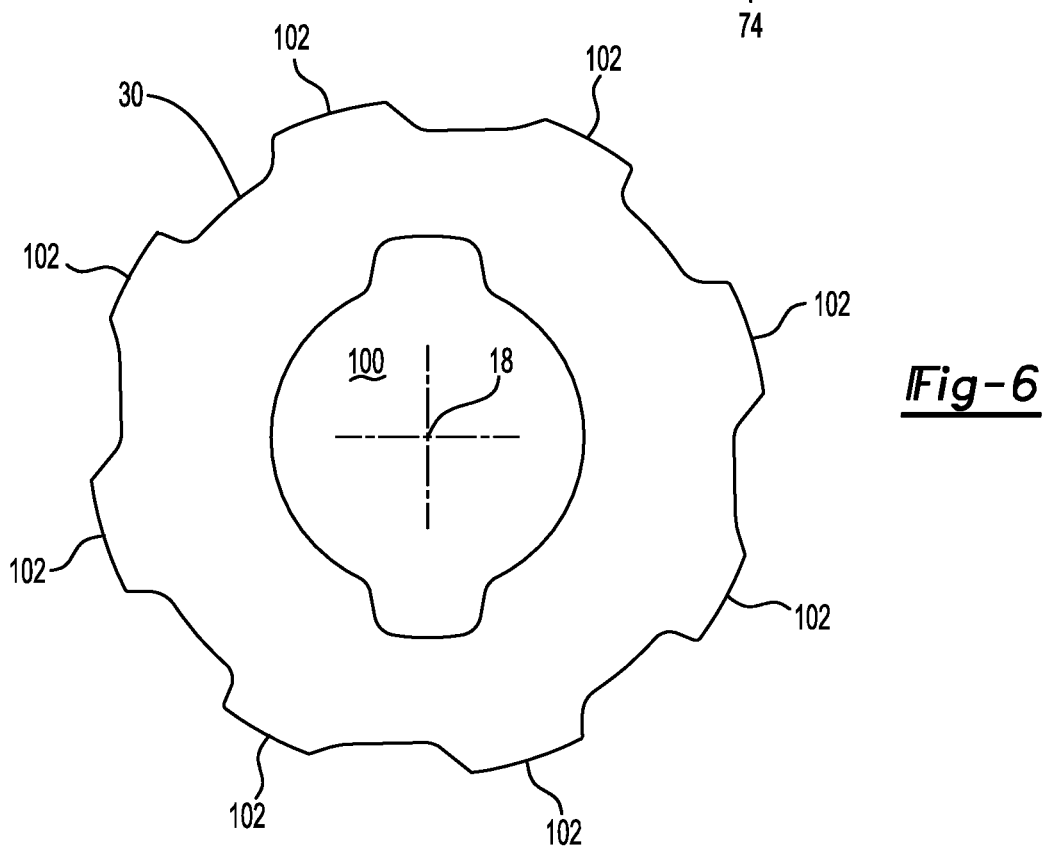
FIG. 6 is a side view of a second cam that may be provided with the recliner mechanism.

Referring to FIGS. 3, 4 and 6, the second cam 30 may facilitate actuation of the cam disc 34. The second cam 30, which may also be referred to as a structural cam, may be configured to rotate about the axis 18 and may be axially positioned between the first plate 20 and the second plate 22 as is best shown in FIG. 8. For example, the second cam 30 may be axially positioned between the second plate 22 and the first cam 28 such that the first cam 28 and the second cam 30 are aligned with and may engage the pawls 32. In at least one configuration, the second cam 30 may include a center hole 100 and a plurality of cam lobes 102.

Referring to FIG. 6, the center hole 100 may extend along the axis 18. In at least one configuration, the center hole 100 may have a non-circular shape that may mate with and facilitate rotational engagement with the driver 38.

The cam lobes 102 may be provided around the periphery of the second cam 30. In FIG. 6, eight cam lobes 102 are shown; however, it is contemplated that a greater or lesser number of cam lobes 102 may be provided. The cam lobes 102 may be disposed opposite the center hole 100, may extend away from the axis 18, and may be selectively engaged by a corresponding pawl 32.

Figure 7:
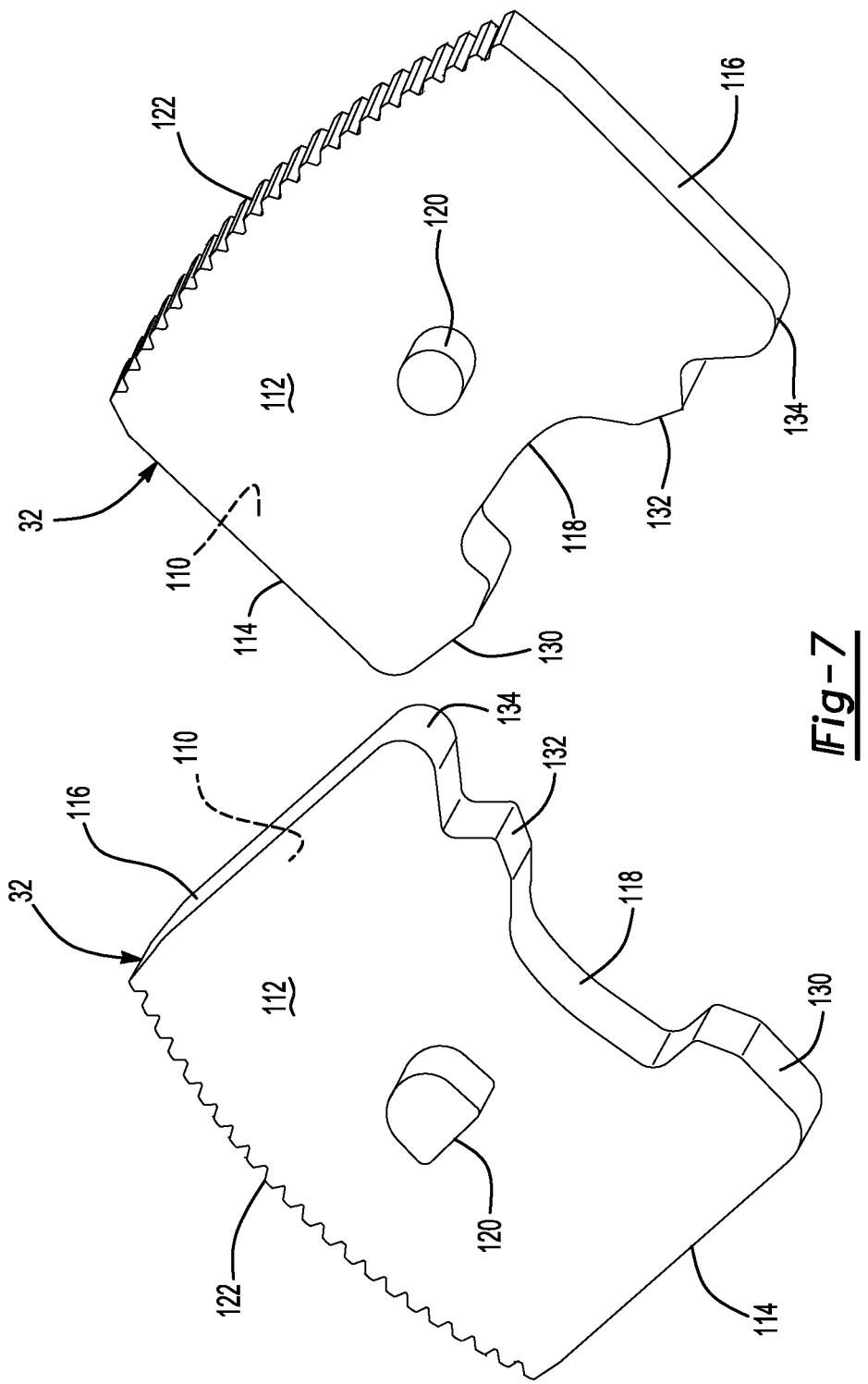
FIG. 7 is a perspective view of pawls that may be provided with the recliner mechanism.

Referring to FIG. 7, the first cam 28 and the second cam 30 may be disposed on opposite sides of a plane 104 that may be disposed perpendicular to the axis 18. For example, the first cam 28 and the second cam 30 may be completely disposed on opposite sides of the plane 104 such that no portion of the first cam 28 is received in the second cam 30 and a portion of the second cam 30 is received in the first cam 28. The plane 104 may also be positioned such that the plane 104 may extend through the first plate 20, the second plate 22, the retainer ring 24, one or more pawls 32, or combinations thereof.

Referring to FIGS. 3, 4, 7 and 8, one or more pawls 32 may be arranged around the first cam 28 and the second cam 30. A pawl 32 may be configured to selectively engage the set of teeth 64 of the second plate 22 as will be discussed in more detail below. The recliner mechanism 16 may accommodate four pawls 32 in the configuration shown; however, it is contemplated that a greater or lesser number of pawls 32 may be provided. As is best shown in FIG. 8, a pawl 32 may be axially positioned between the first plate 20 and the second plate 22. Moreover, the pawls 32 may be axially positioned between the first plate 20 and the cam disc 34. The pawls 32 may be coplanar with each other or may be aligned with the first cam 28 and the second cam 30. A pawl 32 may be located between a pair of guide blocks 54 of the first plate 20.

The pawls 32 may be provided with a common configuration or multiple configurations. In at least one configuration, a pawl 32 may include a first side 110, a second side 112, a first lateral side 114, a second lateral side 116, a cam following side 118, a pawl pin 120, and a set of pawl teeth 122.

Referring primarily to FIGS. 3 and 7, the first side 110 may face toward the first plate 20. The first side 110 may be contact or be supported on the first plate 20.

Referring primarily to FIGS. 4 and 7, the second side 112 may be disposed opposite the first side 110. As such the second side 112 may face toward the second plate 22. The second side 112 may engage the cam disc 34.

Referring primarily to FIG. 7, the first lateral side 114 may extend from the first side 110 to the second side 112. The first lateral side 114 may be disposed adjacent to the set of pawl teeth 122.

The second lateral side 116 may also extend from the first side 110 to the second side 112. The second lateral side 116 may be disposed opposite the first lateral side 114. The second lateral side 116 may be disposed adjacent to the set of pawl teeth 122.

The cam following side 118 may face toward the axis 18 and may be configured to selectively engage the first cam 28 and the second cam 30. For example, the cam following side 118 may be supported by one or more cam lobes 74 of the first cam 28 when the first cam 28 is rotated to extend the pawl 32 away from the axis 18. The cam following side 118 may extend from the first side 110 to the second side 112. In at least one configuration, the cam following side 118 may include a plurality of pawl lobes that may extend away from the set of pawl teeth 122 and toward the axis 18, such as a first pawl lobe 130, a second pawl lobe 132, and a third pawl lobe 134.

The first pawl lobe 130 may be disposed proximate the first lateral side 114. For example, the first pawl lobe 130 may extend from the first lateral side 114 toward the second pawl lobe 132. The first pawl lobe 130 may extend further toward the axis 18 than the second pawl lobe 132 and the third pawl lobe 134.

The second pawl lobe 132 may be disposed between the first lateral side 114 and the second lateral side 116. Moreover, the second pawl lobe 132 may be disposed between and may optionally be spaced apart from the first pawl lobe 130 and the third pawl lobe 134.

The third pawl lobe 134 may be disposed proximate the second lateral side 116. For example, the third pawl lobe 134 may extend from the second lateral side 116 toward the second pawl lobe 132. In at least one configuration, the third pawl lobe 134 may extend further toward the axis 18 than the second pawl lobe 132.

The pawl pin 120 may extend from the second side 112 of the pawl 32 toward the cam disc 34. In at least one configuration, the pawl pin 120 may be disposed at or near the center of the pawl 32. The pawl pins 120 may be provided with a common configuration or multiple configurations. In the configuration shown, two pawls 32 are provided with pawl pins 120 having a D shape while two other pawls 32 are provided with pawl pins 120 having a cylindrical shape. The pawl pins having a cylindrical shape may have a smaller cross section than the pawl pins having the D shape The set of pawl teeth 122 may be disposed opposite the cam following side 118. The set of pawl teeth 122 may extend from the first side 110 to the second side 112. In addition, the set of pawl teeth 122 may be arranged between the first lateral side 114 and the second lateral side 116. The set of pawl teeth 122 may have the same profile as the set of teeth 64 or a profile that is compatible with the set of teeth 64. The pawl teeth 122 may be contiguous with each other or may be discontinuous if such an arrangement is compatible with the set of teeth 64.

Referring to FIGS. 3, 4, and 8, the cam disc 34 may be configured to actuate the pawls 32 when the cam disc 34 is rotated about the axis 18 as will be discussed in more detail below. As is best shown in FIG. 8, the cam disc 34 may be received inside the second plate 22 and may be axially positioned between the first plate 20 and the second plate 22. For example, the cam disc 34 may be axially positioned between the pawls 32 and the second plate 22. The cam disc 34 may be configured as a substantially flat disc that may be disposed substantially perpendicular to the axis 18 and substantially parallel to the plane 104 but may not intersect the plane 104. The cam disc 34 may be generally circular and may extend around the axis 18. As is best shown in FIGS. 3 and 4, the cam disc 34 may include a center hole 140 and one or more pawl actuation openings 142.

The center hole 140 may extend around the axis 18. The center hole 140 may be configured to mate or interlock with the cam lobes 102 of the second cam 30 such that the cam disc 34 rotates with the second cam 30. The center hole 140 may or may not be contiguous with a pawl actuation opening 142.

A pawl actuation opening 142 may be configured to guide movement of a corresponding pawl 32 when the cam disc 34 is rotated about the axis 18 by the second cam 30. The pawl pin 120 of a pawl 32 may be received in or may extend through a corresponding pawl actuation opening 142. The pawl actuation opening 142 may be angled or tapered such that the pawl actuation opening 142 guides the pawl pin 120, and hence the pawl 32, toward the axis 18 when the cam disc 34 rotates about the axis 18 in a first direction. Similarly, the pawl actuation opening 142 may guide or permit the pawl pin 120, and hence the pawl 32, to move away from the axis 18 when the cam disc 34 is rotated about the axis 18 in a second direction that is disposed opposite the first direction. For instance, the pawl actuation opening 142 may be defined by one or more surfaces of the cam disc 34. An outer surface 144 of the pawl actuation opening 142 that may face toward the axis 18 may be angled or contoured such that the outer surface 144 may be disposed closer to the axis 18 at a first end than at a second end that may be disposed opposite the first end. The pawl pin 120 may slide along the outer surface 144 when the cam disc 34 is rotated about the axis 18. As such, the outer surface 144 may exert force on the pawl pin 120 and guide movement of the pawl 32. A pawl 32 may be retracted toward the axis 18 when the cam disc 34 rotates about the axis 18 in a first direction, such as a clockwise direction from the perspective shown in FIG. 9, and may be permitted to move away from the axis 18 when the cam disc 34 is rotated about the axis 18 in a second direction, such as a counterclockwise direction from the perspective shown in FIG. 9.

Referring to FIGS. 3 and 4, one or more biasing members 36 may exert a biasing force on the first cam 28 to urge the first cam 28 to rotate in a manner that actuates the pawls 32 away from the axis 18. In the configuration shown, two biasing members 36 are shown; however, it is contemplated that a greater or lesser number of biasing members 36 may be provided. As is best shown in FIG. 8, a biasing member 36 may be axially positioned between the first plate 20 and a pawl 32. For instance, a biasing member 36 may be received in a slot 56 in the first plate 20 and may engage the first plate 20 and the first cam 28. As an example, the biasing member 36 may engage a mounting feature 58 of the first plate 20 and a pin 72 of the first cam 28. The biasing member 36 may be of any suitable type and may have any suitable configuration. For example, the biasing member 36 may be configured as a spring.

Referring to FIGS. 3, 4, and 8, the driver 38 may be rotatable about the axis 18 and may be configured to control actuation of the recliner mechanism 16. In at least one embodiment, the driver 38 may include a body 150 and a hub 152.

The body 150 may be disposed proximate or adjacent to the first plate 20. The body 150 may extend away from the axis 18 and facilitate mounting of the driver biasing member 42. In addition, the body 150 may receive force from an actuator that may rotate the driver 38 about the axis 18. For example, the driver 38 may be manually actuated or may be coupled to an actuator that may rotate the driver 38 in at least one direction about the axis 18. The actuator may be of any suitable type, such as a mechanical, electromechanical, or electrical actuator. Some examples of actuators include, but are not limited to a handle, electric motor, cable, or combinations thereof.

The hub 152 may extend from the body 150 through various components of the recliner mechanism 16. For instance, the hub 152 may extend along or around the axis 18 and may extend through the center holes of the first plate 20, the second plate 22, the first cam 28, the second cam 30, and the cam disc 34. In at least one embodiment, the hub 152 may include at least one cam engagement feature 154.

Figure 9:
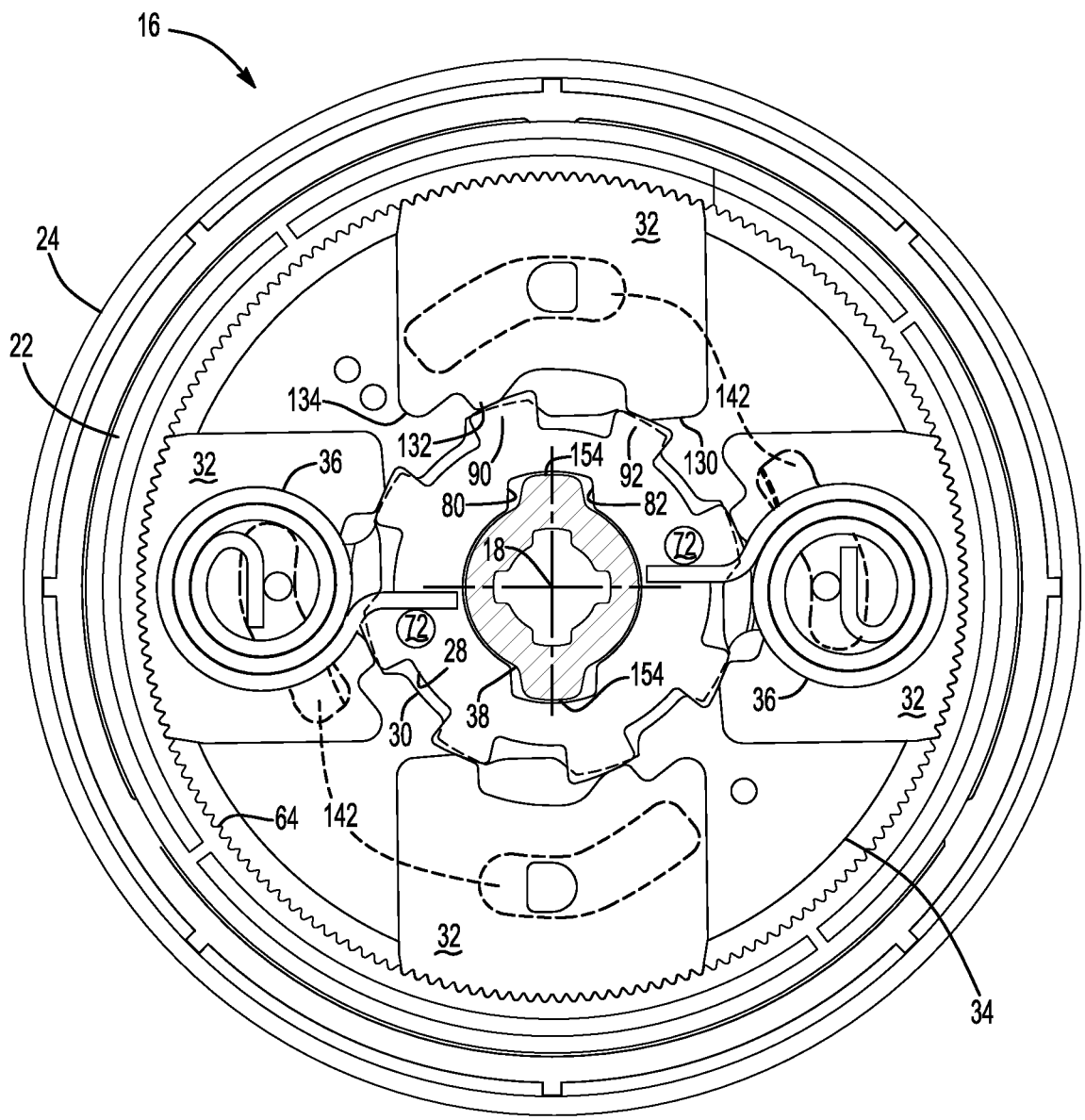
FIG. 9 is a section view of the recliner mechanism along section line 9-9 with a first plate of the recliner mechanism omitted for clarity and in which a driver is shown in a first rotational position and the pawls are in an engaged position.

Referring primarily to FIGS. 4 and 9, the cam engagement feature 154 may be received in the center hole 70 of the first cam 28 and the center hole 100 of the second cam 30. In FIG. 4, a pair of cam engagement features 154 are shown that may be disposed opposite each other and that may extend away from the axis 18; however, it is contemplated that a greater or lesser number of cam engagement features may be provided and that the cam engagement feature or features may have alternative configurations. The cam engagement feature 154 may mate with the second cam 30 such that the driver 38 and the second cam 30 rotate together about the axis 18. As such, the driver 38, second cam 30, and cam disc 34 may rotate together and may not rotate about the axis 18 with respect to each other. The cam engagement feature 154 may be rotatable with respect to the first cam 28 over a predetermined angular distance. As such, the driver 38 may rotate with respect to the first cam 28 over a predetermined distance and may rotate with the first cam 28 when the first cam 28 and a cam engagement feature 154 are rotatably engaged. The driver 38 may be configured to rotate in the first direction and in the second direction about the axis 18. Rotation of the driver 38 may actuate the pawls 32 as will be discussed in more detail below.

Referring to FIGS. 3, 4 and 8, the retainer 40 may secure the driver 38 to the recliner mechanism 16. The retainer 40 may configured as a ring that may be disposed proximate the center hole 70 of the second plate 22 and may engage or be coupled to the hub 152 of the driver 38. As such, the retainer 40 may limit or inhibit axial movement of the driver 38 while permitting the driver 38 to rotate about the axis 18.

Referring to FIGS. 2-4, the driver biasing member 42 may exert a biasing force on the driver 38. For example, the driver biasing member 42 may exert a biasing force on the driver 38 that may urge the driver 38 to rotate in a counterclockwise direction about the axis 18 from the perspective shown in FIGS. 2 and 9-11. In at least one configuration, the driver biasing member 42 may be configured as a spring and may have a first arm and a second arm. The first arm may be coupled to the driver 38. The second arm may be coupled to a stationary component, such as the first plate 20 or the seat bottom frame.

Operation of the recliner mechanism 16 will now be described in more detail. It is noted that in FIGS. 9-11 the outside perimeter of the pawl pins 120 is not visible since the pawl pins 120 extend away from the viewer. As such, the "D" shape and "O" shape near the center of each pawl that is drawn with solid lines represents an indentation that is visible from the perspective shown. Accordingly, the outside perimeter of the pawl pins 120 may be larger than these indentations and thus may extend to an edge or side of a corresponding pawl actuation opening 142.

Referring to FIG. 9, the recliner mechanism 16 is shown in a locked condition. In the locked condition the pawls 32 may be in an engaged position in which the pawl teeth 122 of the pawls 32 engage and mesh with the set of teeth 64, thereby limiting or inhibiting rotation of the second plate 22 about the axis 18 and with respect to the first plate 20. It is noted that the engaged position includes pawl positions in which pawls 32 engage and mesh with the set of teeth 64 to limit or inhibit free rotation of the second plate 22. As such, the engaged position may include a small range of travel of the pawls 32 and may not be limited to the pawls 32 being positioned at a single radial distance from the axis 18. The pawls 32 may be held in the engaged position by the first cam 28 or the first cam 28 and the second cam 30. Normally, at least one cam lobe 74 of the first cam 28 may engage a pawl lobe on a pawl 32. For example, a first cam lobe 90 of the first cam 28 may engage the second pawl lobe 132 of a pawl 32 while a second cam lobe 92 of the first cam 28 may engage the first pawl lobe 130 of the pawl 32. The biasing members 36 may exert force on the first cam 28 to inhibit rotation of the first cam 28 and hold the pawls 32 in the engaged position.

In FIG. 9, the driver 38 is shown in a first rotational position. The cam engagement features 154 of the driver 38 may be spaced apart from the first side surface 80 and the second side surface 82 of the center hole 70 of the first cam 28 when the driver 38 is in the first rotational position. The cam lobes 102 of the second cam 30 may be generally aligned with the cam lobes 74 of the first cam 28 when the driver 38 is in the first rotational position. This allows the second cam 30 to act as a safety lock that may hold the pawls 32 in the engaged position in the event of damage or unintended operational problems an example of which is shown in FIG. 9a.

Figure 9A:
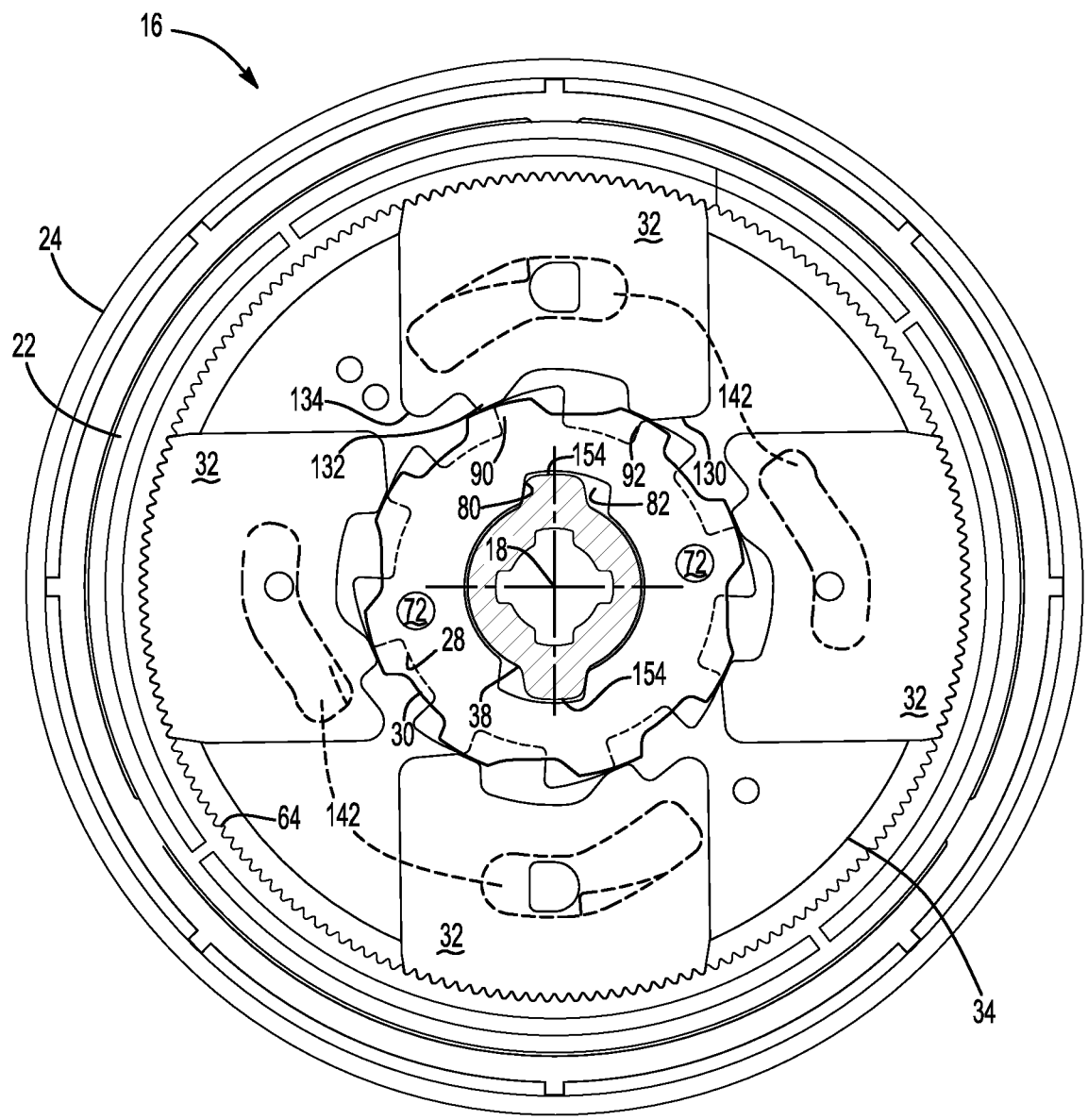
FIG. 9a is a section view of the recliner mechanism in which the driver is in the first rotational position and the second cam supports the pawls in the engaged position.

In FIG. 9a, the biasing members 36 have been removed to represent failure to hold the first cam 28 in the rotational position shown in FIG. 9. For instance, if the biasing members 36 failed or the first cam 28 was otherwise permitted to rotate in a clockwise direction about the axis 18 with respect to the driver 38 from the perspective shown in FIG. 9, then the first cam 28 may eventually not maintain the pawls 32 in the engaged position. In such a situation, the second cam 30 may hold the pawls in the engaged position. For instance, the pawls 32 may then contact with the cam lobes 102 of the second cam 30. It is noted that the pawls 32 may rotate slightly and/or move slightly toward the axis 18 before contacting the cam lobes 102, but the pawl teeth 122 may remain in meshing engagement with the teeth 64 of the second plate 22 and thus be in the extended position. As such, the second cam 30 may help prevent unanticipated backdriving of the pawls 32 toward the axis 18 that could permit rotation of the second plate 22 and movement of the seat back 14 that has not been requested by a seat occupant. The biasing force exerted by the driver biasing member 42 may help hold the second cam 30 in position and inhibit rotation of the driver 38 and the second cam 30. The second cam 30 may also have a zero-degree lock angle that may not rotate or permit backdriving during dynamic loading. As such, the cam lobes 102 of the second cam 30 may be configured to support the pawls 32 without allowing the force exerted by the pawls 32 to rotate or spin the second cam 30 in a manner that would allow the pawl teeth 122 to disengage the teeth 64 of the second plate 22. It is also noted that the first side surface 80 of the first cam 28 may engage a cam engagement feature 154 when the first cam 28 rotates with respect to the driver 38 and the second cam 30 to the position shown in FIG. 9a. In such a position, the first cam 28 and the second cam 30 may both engage the pawls 32 and hold the pawls 32 in the engaged position. For instance, lobes of the first cam 28 and second cam 30 may contact the first pawl lobe 130, the second pawl lobe 132, or both.

Figure 10:
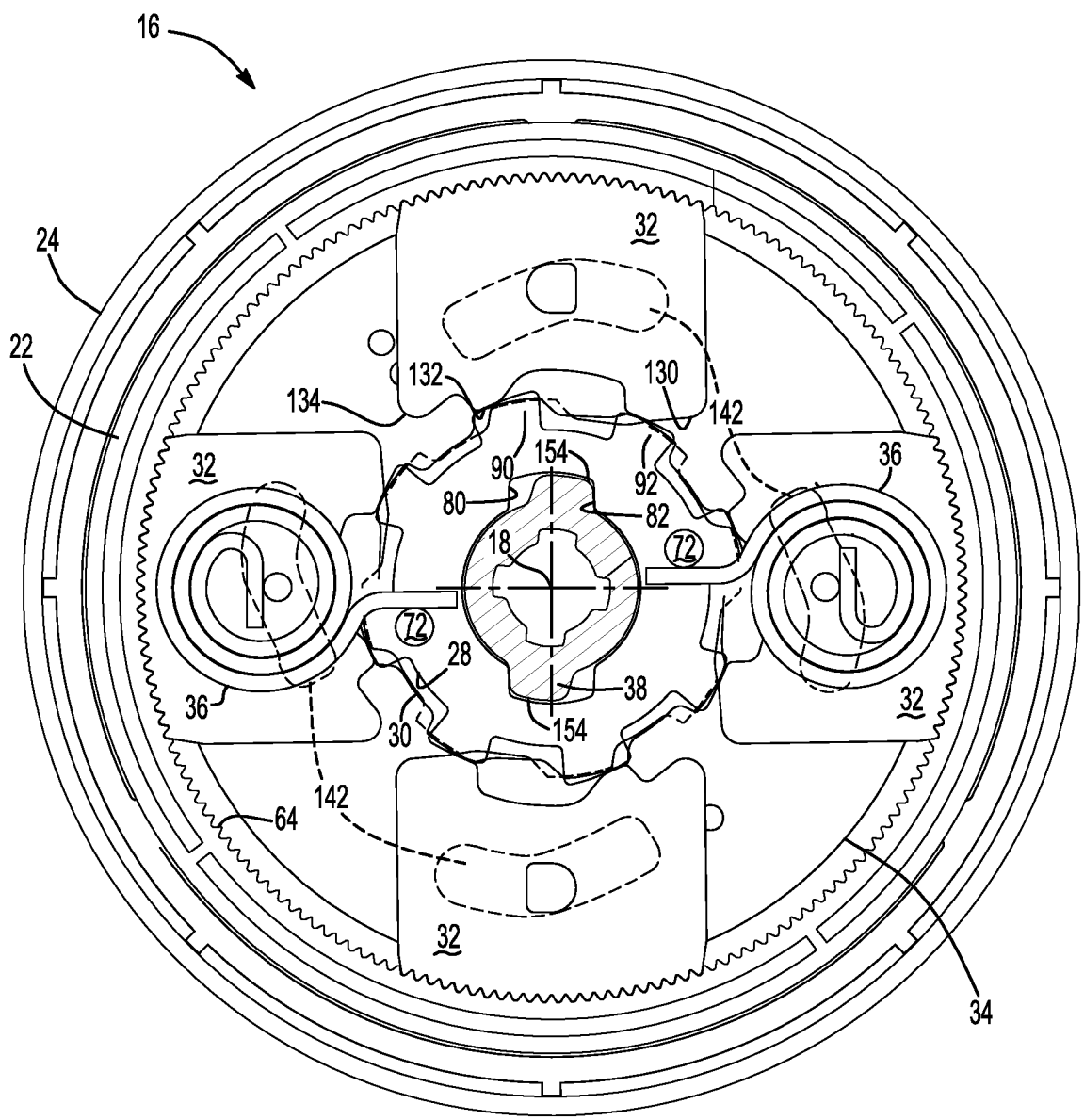
FIG. 10 is a section view of the recliner mechanism in which the driver is in a second rotational position.

Referring to FIG. 10, the driver 38 is shown rotated about the axis 18 to a second rotational position. The driver 38 may move to the second rotational position when sufficient force is applied to the driver 38 to overcome the biasing force of the driver biasing member 42. For example, the driver 38 may be rotated in a first direction about the axis 18 (or a clockwise direction from the perspective shown) in FIG. 10 as compared to FIG. 9. The cam engagement feature 154 of the driver 38 may engage or contact a second side surface 82 of the first cam 28 when the driver 38 is in the second rotational position. The second cam 30 and the cam disc 34 may rotate with the driver 38 about the axis 18.

Figure 11:
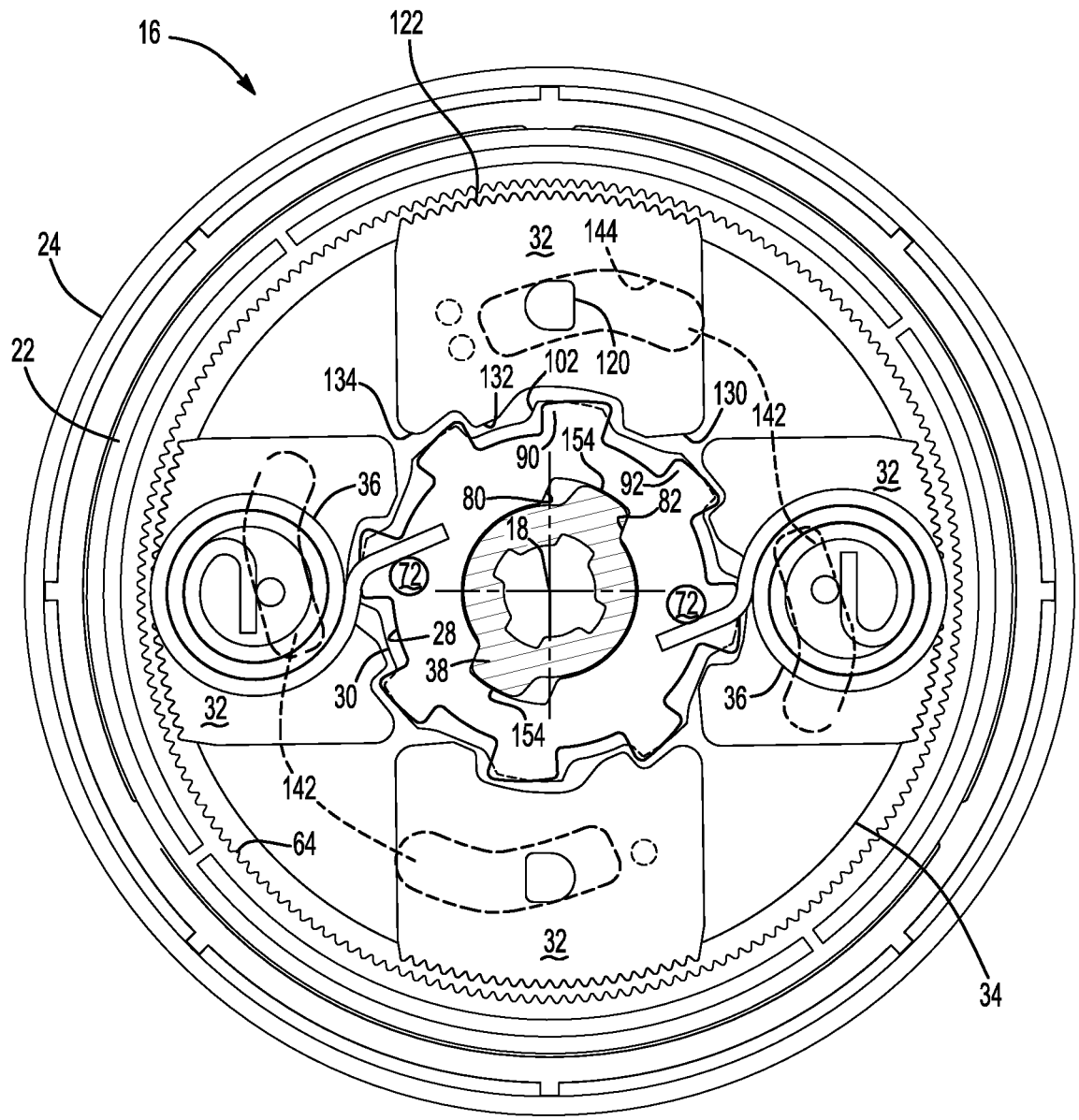
FIG. 11 is a section view of the recliner mechanism in which the driver is in a third rotational position and the pawls are in a retracted position.

Referring to FIG. 11, the driver 38 is shown rotated about the axis 18 to a third rotational position and the pawls 32 are shown in a retracted position or a disengaged position. The driver 38 may move to the third rotational position when sufficient force is applied to the driver 38 to overcome the biasing force of the biasing members 36. For example, the driver 38 may be rotated in the first direction about the axis 18 (or a clockwise direction from the perspective shown) in FIG. 11 as compared to FIG. 10. As such, the first cam 28, second cam 30, and cam disc 34 may rotate together about the axis 18. The cam disc 34 may exert force on the pawls 32 and retract the pawls 32 to the retracted position. For example, the outer surface 144 of the pawl actuation openings 142 may exert force on the pawl pins 120 due to the curvature of the outer surface 144 and may push the pawls 32 toward the axis 18 as the driver 38 rotates from the second rotational position to the third rotational position. As such, the pawl teeth 122 of the pawls 32 may disengage the set of teeth 64 on the second plate 22, thereby allowing the second plate 22 to rotate about the axis 18 with respect to the first plate 20. Accordingly, the seat back 14 may be folded or reclined to a different angular position as desired.

Some or all of the cam lobes 74 of the first cam 28 and some or all of the cam lobes 102 of the second cam 30 may be disengaged from the pawls 32 when the pawls 32 are in the retracted position. For example, the first cam lobes 90 of the first cam 28 and the cam lobes 102 of the second cam 30 may be disengaged from the pawls 32. The second cam lobes 92 of the first cam 28 may either be disengaged from the pawls 32 or may rest on a pawl lobe, such as on a different surface of the first pawl lobe 130 when the pawls 32 are retracted.

Once the seat back 14 is in a desired angular position, the pawl 32 may be extended or may return to the engaged position under the biasing force of the biasing member 36 when the driver 38 is released or is permitted to return to the engaged position. For instance, the pawls 32 may move from the retracted position to the engaged position by generally reversing the operation sequence previously described. Rotation of the driver 38 in a second direction about the axis 18 (i.e., a direction opposite the first direction or counterclockwise from the perspective shown in FIGS. 9-11) may initially rotate the second cam 30 and the cam disc 34 but not the first cam 28. The cam engagement features 154 of the driver 38 may contact the first side surface 80 of the first cam 28, thereby initiating rotation of the first cam 28 in the second direction. The cam lobes 74 of the first cam 28 may move into engagement with the pawl lobes. Further rotation may cause the cam lobes 74 of the first cam 28 to extend and hold the pawls 32 in the engaged position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism comprising:
   a first plate;
   a second plate that is rotatable about an axis with respect to the first plate, the second plate having a set of teeth;
   a set of pawls that are moveable between an engaged position in which the pawls engage the teeth to inhibit rotation of the second plate with respect to the first plate and a retracted position in which the pawls do not engage the teeth to permit rotation of the second plate with respect to the first plate;
   a first cam that is rotatable about the axis and engages the pawls to hold the pawls in the engaged position; and
   a second cam that is rotatable about the axis with respect to the first cam, wherein the first cam is not received in the second cam, the second cam is not received in the first cam, and the second cam is spaced apart from the pawls when the pawls are in the retracted position.

2. The recliner mechanism of claim 1 wherein the second cam does not actuate the first cam and the first cam does not actuate the second cam.

3. The recliner mechanism of claim 1 wherein the second cam extends further from the axis than the first cam.

4. The recliner mechanism of claim 1 wherein the first cam and the second cam are completely disposed on opposite sides of a plane that is disposed perpendicular to the axis.

5. The recliner mechanism of claim 4 further comprising a cam disc that receives the second cam and operatively connects the second cam to the set of pawls, wherein the cam disc is disposed parallel to the plane and is spaced apart from the plane.

6. The recliner mechanism of claim 4 wherein the plane extends through the set of pawls.

7. The recliner mechanism of claim 6 wherein the plane extends through the first plate and the second plate.

8. A recliner mechanism comprising:
   a first plate;
   a second plate that is rotatable about an axis with respect to the first plate, the second plate having a set of teeth;
   a set of pawls that are moveable between an engaged position in which the pawls engage the teeth to inhibit rotation of the second plate with respect to the first plate and a retracted position in which the pawls do not engage the teeth to permit rotation of the second plate with respect to the first plate;
   a first cam that is rotatable about the axis;
   a second cam that is rotatable about the axis, wherein the first cam does not actuate the second cam and the second cam does not actuate the first cam; and
   a driver that is configured to rotate the first cam and the second cam, wherein the first cam engages and holds the pawls in the engaged position when the driver is in a first rotational position, the first cam engages the pawls when the driver is in a second rotational position, and the first cam engages the pawls and the second cam is spaced apart from the pawls and the pawls are in the retracted position when the driver is in a third rotational position.

9. The recliner mechanism of claim 8 wherein the second rotational position is between the first rotational position and the third rotational position.

10. The recliner mechanism of claim 8 wherein the first cam and the second cam are contactable with the set of pawls.

11. The recliner mechanism of claim 8 wherein the driver is rotatable about the axis and is received in and engages the first cam and the second cam.

12. The recliner mechanism of claim 8 wherein the second cam is disengaged from the pawls when the pawls are in the engaged position and the driver is in the first rotational position.

13. The recliner mechanism of claim 8 wherein the driver has a cam engagement feature that extends away from the axis and engages the second cam, wherein the cam engagement feature is spaced apart from the first cam when the driver is in the first rotational position.

14. The recliner mechanism of claim 13 wherein the cam engagement feature engages the first cam when the driver is in the second rotational position.

15. A recliner mechanism comprising:
   a first plate;
   a second plate that is rotatable about an axis with respect to the first plate, the second plate having a set of teeth;
   a set of pawls that are moveable between an engaged position in which the pawls engage the teeth to inhibit rotation of the second plate with respect to the first plate and a retracted position in which the pawls do not engage the teeth to permit rotation of the second plate with respect to the first plate, wherein each pawl has a first pawl lobe and a second pawl lobe;
a first cam that is rotatable about the axis and engages the pawls to hold the pawls in the engaged position;
a second cam that is rotatable about the axis; and
a driver that is configured to rotate the first cam and the second cam, wherein the first cam engages the first pawl lobe and the second pawl lobe to hold the pawls in the engaged position when the first cam is inhibited from rotating about the axis and the driver is in a first rotational position and second cam engages the first pawl lobe and the second pawl lobe to hold the pawls in the engaged position when the driver is in the first rotational position and the first cam is rotated about the axis with respect to the driver.

16. The recliner mechanism of claim 15 wherein each pawl has a third pawl lobe and the second pawl lobe is disposed between and spaced apart from the first pawl lobe and the third pawl lobe.

17. The recliner mechanism of claim 16 wherein the first cam and the second cam engage the first pawl lobe when the driver is in the first rotational position and the first cam is rotated about the axis with respect to the driver.

18. The recliner mechanism of claim 17 wherein the first cam engages the first pawl lobe when the driver is in a third rotational position.

19. The recliner mechanism of claim 15 wherein the first cam has a first cam lobe and a second cam lobe, wherein the first cam lobe extends further from the axis than the second cam lobe.

20. The recliner mechanism of claim 19 the first cam lobe and the second cam lobe engage a member of the set of pawls when the pawls are in the engaged position and the first cam lobe is spaced apart from the pawls and the second cam lobe engages the member of the set of pawls when the pawls are in the retracted position.

* * * * *